No. 810,540. PATENTED JAN. 23, 1906.
H. S. & W. G. JONES.
LEAF FLEXING MACHINE.
APPLICATION FILED NOV. 25, 1904.

Witnesses:
Inventors:
Harry Sloper Jones &
William Gifford Jones,
By Dyrenforth, Dyrenforth & Lee,
Att'ys.

No. 810,540. PATENTED JAN. 23, 1906.
H. S. & W. G. JONES.
LEAF FLEXING MACHINE.
APPLICATION FILED NOV. 25, 1904.

Witnesses:
Chas. E. Gaylord.
John Enders.

Inventors:
Harry Sloper Jones &
William Gifford Jones,
By Dyrenforth, Dyrenforth & Lee,
Att'ys.

No. 810,540. PATENTED JAN. 23, 1906.
H. S. & W. G. JONES.
LEAF FLEXING MACHINE.
APPLICATION FILED NOV. 25, 1904.

No. 810,540. PATENTED JAN. 23, 1906.
H. S. & W. G. JONES.
LEAF FLEXING MACHINE.
APPLICATION FILED NOV. 25, 1904.

Witnesses:
Chas. E. Gaylord.
John Enders.

Inventors.
Harry Sloper Jones &
William Gifford Jones,
By Dyrenforth, Dyrenforth & Lee,
Att'ys.

UNITED STATES PATENT OFFICE.

HARRY SLOPER JONES AND WILLIAM GIFFORD JONES, OF CHICAGO, ILLINOIS.

LEAF-FLEXING MACHINE.

No. 810,540.   Specification of Letters Patent.   Patented Jan. 23, 1906.

Application filed November 25, 1904. Serial No. 234,204.

*To all whom it may concern:*

Be it known that we, HARRY SLOPER JONES and WILLIAM GIFFORD JONES, citizens of the United States, residing at Chicago, in the county of Cook and State of Illinois, have invented a new and useful Improvement in Leaf-Flexing Machines, of which the following is a specification.

Our invention pertains to the manufacture of book-leaves having zones of relatively high flexibility parallel with and adjacent to their binding-margins.

Our primary object is to provide a thoroughly-practical machine capable of use in the production on a commercial scale of leaves having their sizing-coatings minutely fractured over a limited zone by a suitable flexing operation, the operation being such as to uniformly weaken said coatings as regards stiffness without materially weakening the fiber of the paper or establishing any definite lines of weakness at the treated zone.

In the accompanying drawings is illustrated a machine peculiarly adapted to secure the desired result in which provision is made for bending a leaf closely upon itself near its binding edge and varying or shifting the place of curvature and then reversing the direction of curvature and varying the location thereof uniformly throughout the same zone. In fact, the machine when geared as shown is adapted to perform a cycle of operations, serving to apply the shifting flexure to the leaf in one direction, then in the reverse direction, then again in the original direction, and, finally, again in the reverse direction.

In the embodiment shown there are employed an axially-rocking gripping-roll equipped with pneumatically-actuated jaws, two concaves or shoes located on opposite sides of the plane whereat the gripping-surfaces of the jaws meet in gripping the leaf and equipped with suction devices, and means for controlling the movement of the roll, the air-pressure for actuating the jaws thereof, and the suction at the concaves.

The construction and operation are such that the leaf is gripped by the jaws at a position intermediate of the concaves; the roll is rocked in one direction to the limit, drawing the rear portion of the leaf between itself and one concave, the suction operating in the meantime to hold the leaf against the concave; the roll then returns to its original position, turning the paper upon itself at a constantly-shifting line; the roll continues its movement and carries the leaf beneath the other concave, the suction being applied there; the roll then returns to its starting position, applying a shifting curvature in the opposite direction; the same cycle of operation is repeated, and the pneumatic-pressure mechanism then operates automatically to release the jaws.

The machine comprises in its preferred embodiment a frame A; a jaw-equipped oscillating or rocking roll or rock-cylinder B, journaled in the upper ends of the side members of said frame and equipped with a piston for actuating the jaws; adjustably-supported leaf holding and confining members; concaves or shoes C D in juxtaposition to the roll B, said members being equipped with suction devices C' D', respectively; an automatic suction-controlling valve E; an air-tank having exhaust and pressure compartments F F', respectively; a driving-shaft G, equipped with tight and loose pulleys; a pump-actuating shaft G'; a rock-cylinder-actuating shaft $G^2$; a cam-shaft $G^3$, serving in the operation of starting and stopping the machine; a pawl-equipped shaft $G^4$, upon which is mounted a pawl $G^5$, coacting with a cam $G^6$, mounted on and capable of limited movement with relation to the shaft $G^3$; a foot-lever H, serving to actuate a rod H', equipped with a pawl $H^2$, coacting with the cam $G^6$; a pressure-controlling valve I, actuated by the lever $G^5$ and controlling the admission of air to the piston for actuating the jaws of the rock-cylinder; a gear J, loosely mounted on one end of the shaft $G^2$ and equipped with a clutch device J', controlled by a rock-lever $J^2$, loosely mounted on one end of the shaft $G^3$ and actuated by an arm $J^3$, with which one end of the shaft $G^4$ is equipped; a pump K, having its piston-rod K' joined to a crank $K^2$ on the shaft G'; a connecting-rod L joining a crank L' on the shaft $G^2$ to a rock-arm $L^2$, serving to actuate the rock-cylinder B; a table M, serving to support the leaves; pipes N N', which serve alternately as admission and exhaust pipes connected with the cylinders of the jaw-actuating piston, the admission and exhaust from said pipes being controlled by the valve I; a pinion P on the shaft G, meshing with the gear J and with the gear P' on the shaft G', and intermeshing gears $P^2$ $P^3$ on the shafts $G^2$ $G^3$, respectively, providing for rotation of the shaft $G^3$ at one-half the speed of the shaft $G^2$.

The frame A may be of any suitable construction. As shown, it comprises side members $a$ $a'$ and a connecting member $a^2$, joining said side members some distance below their upper ends.

Figures 17, 18:
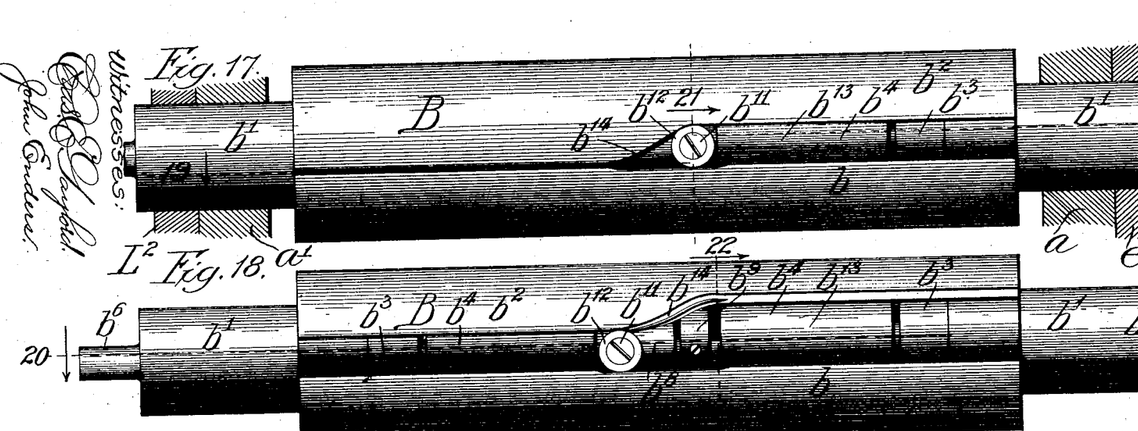
Figs. 17 and 18, rear views of the gripping-roll, the former showing the position of the jaw-closing piston when the jaws are open and the latter showing the position when the jaws are closed.
Figure 19:
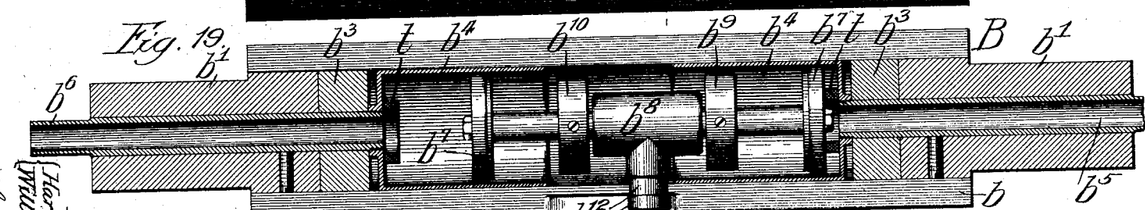
Fig. 19, a section taken as indicated at line 19 of Fig. 17.
Figure 20:
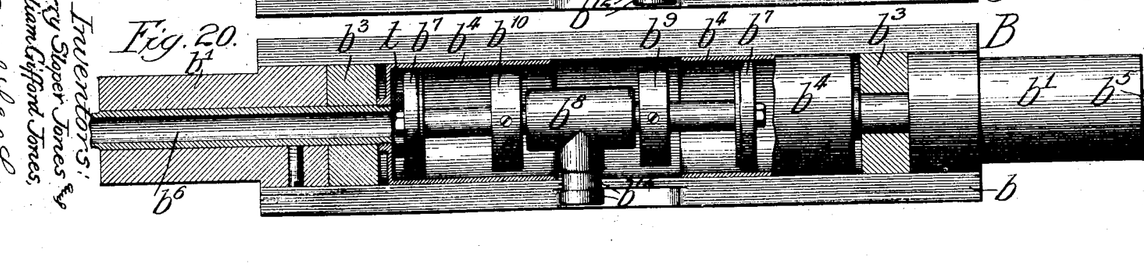
Fig. 20, a similar section taken as indicated at line 20 of Fig. 18.
Figure 21:
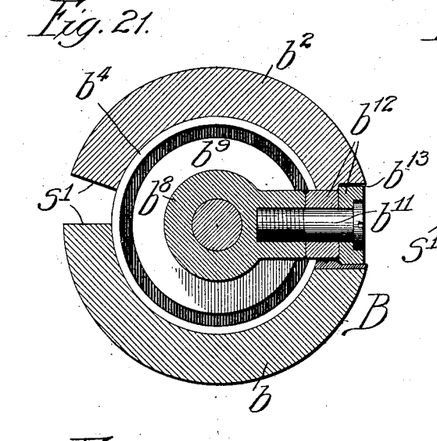
Figs. 21 and 22, sections taken, respectively, at the corresponding lines of Figs. 17 and 18.
Figure 22:
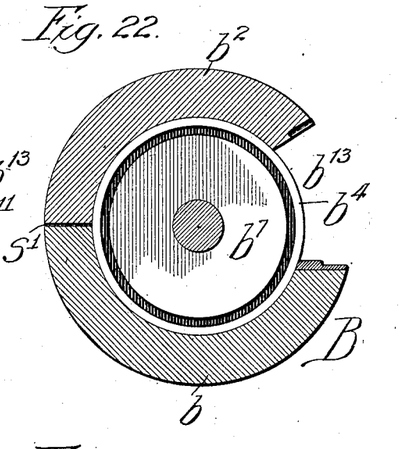
Figure 23:
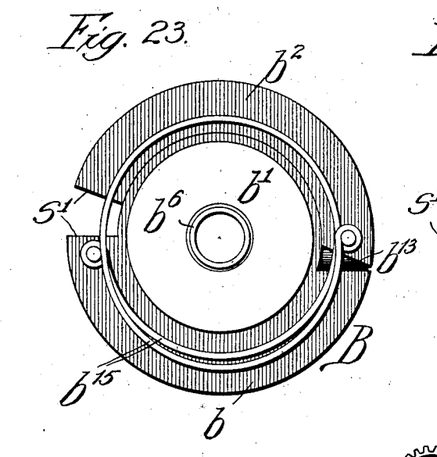
Figs. 23 and 24, end elevational views corresponding, respectively, with the sectional views Figs. 21 and 22.
Figure 24:
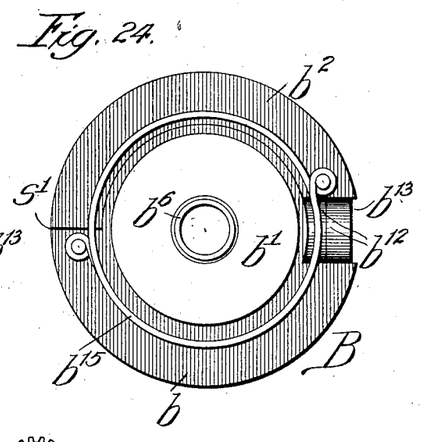

The rock-cylinder B, which serves as a leaf confining and holding member, as well as a shifting or feeding member, preferably comprises one part-cylindrical member or jaw $b$, equipped with trunnions $b'$, upon one of which trunnions the rock-arm $L^2$ is secured; a coacting part-cylindrical jaw $b^2$, having perforate pivot-lugs $b^3$; cylinders $b^4$, located within the rock-cylinder and having connected therewith pipe-sections $b^5$ $b^6$, which pass axially through the trunnions $b'$ and are connected with the pipes N N', respectively; a reciprocating piston $b^7$; a jaw-actuating member $b^8$, loosely mounted upon the shaft of said piston between collars $b^9$ $b^{10}$ on said shaft, the member $b^8$ bearing a laterally-projecting stud $b^{11}$, equipped with rollers $b^{12}$, engaging a slot $b^{13}$ between the rear or non-gripping edges of the jaws, said slot terminating at one end in an oblique or inclined cam-surface $b^{14}$, serving when the rollers $b^{12}$ pass beneath it to close the jaws, and a spring $b^{15}$, connecting the jaws and serving normally to hold them open. From what has been stated it will be understood that the rock-cylinder is oscillated through the medium of its trunnion, and it is now apparent that when the piston is moved from the position shown in Figs. 17 and 19 to the position shown in Figs. 18 and 20 it operates to close the jaws of the rock-cylinder, and when the piston is actuated in the opposite direction the pressure upon the cam-surface $b^{14}$ is removed and the spring $b^{15}$ operates to open the jaws. In the opening and closing operations mentioned the jaw $b^2$ turns upon the pipes $b^5$ $b^6$ as an axis.

Figure 1:
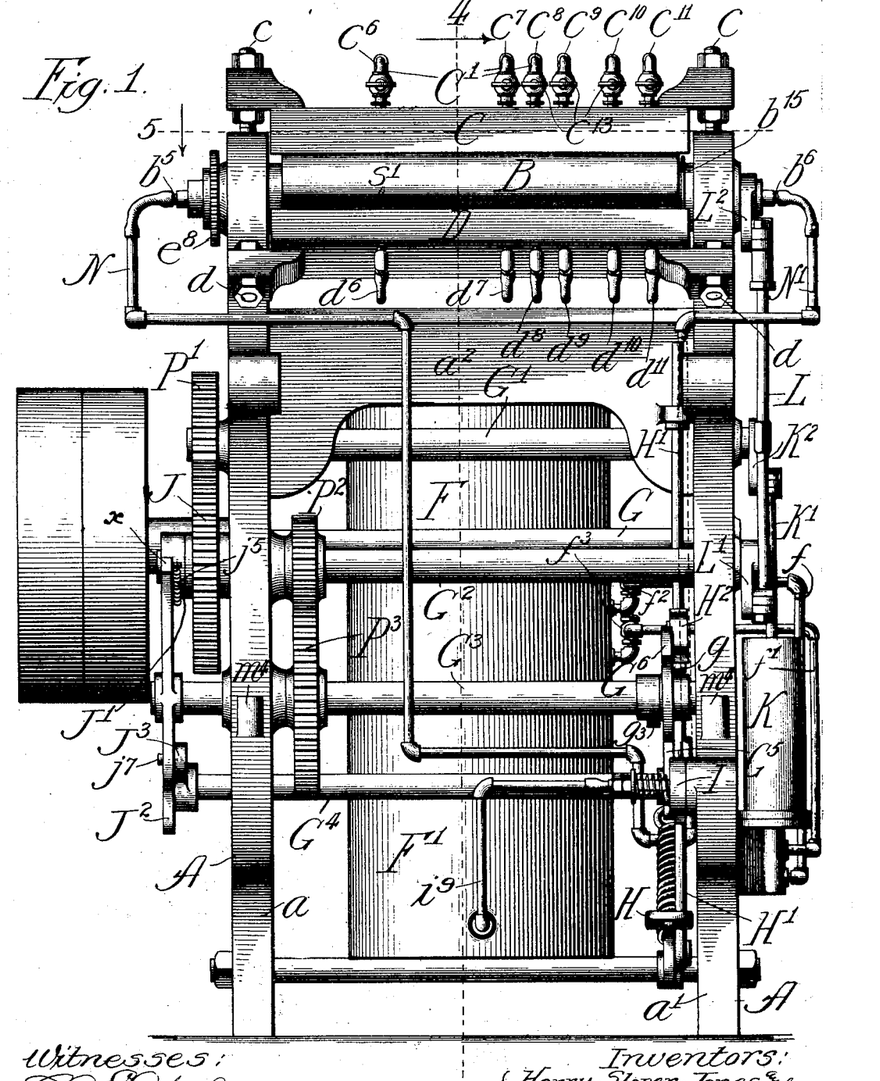
Figure 1 represents a front view of a machine embodying our invention.
Figure 2:
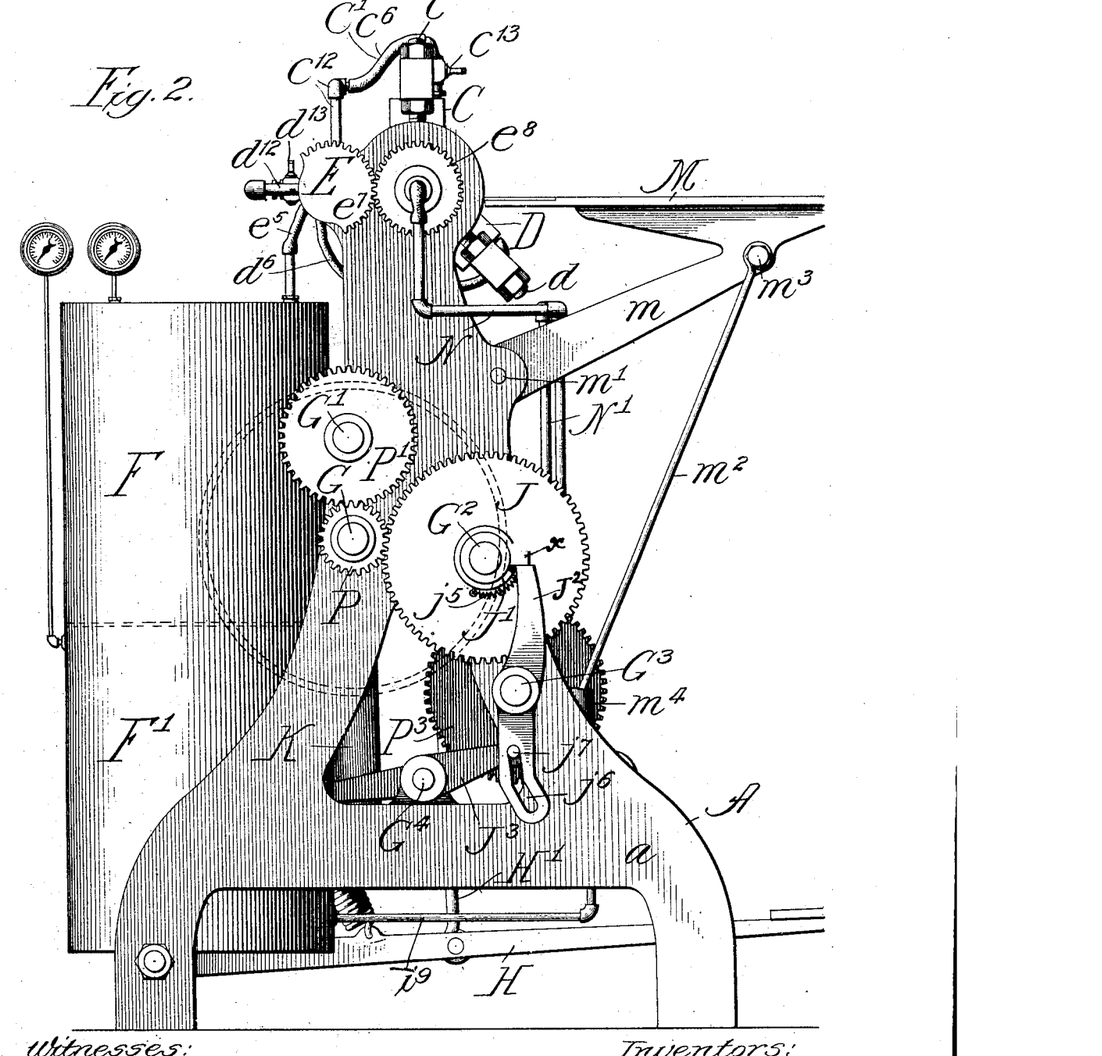
Fig. 2, a view of the right side of the machine, (facing with the machine;) Fig. 3, a view of the left side of the machine.
Figure 3:
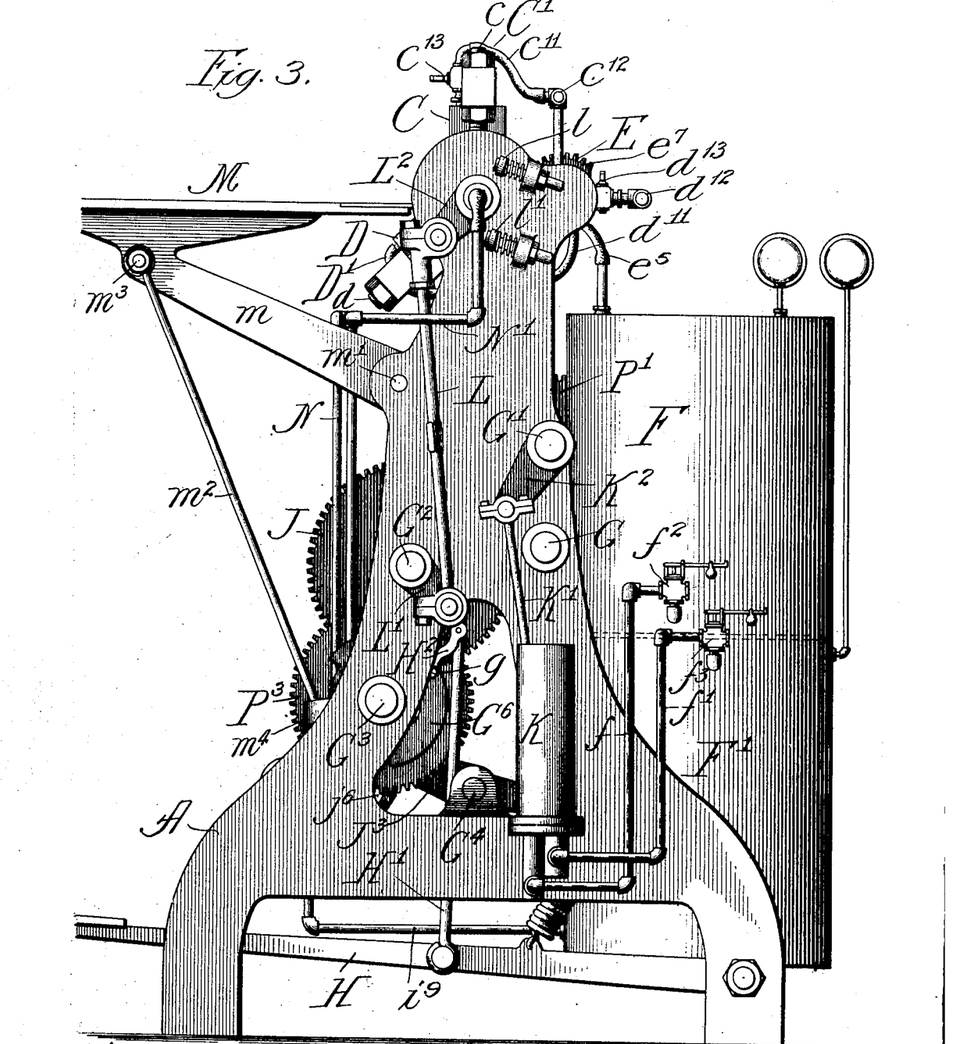
Figure 4:
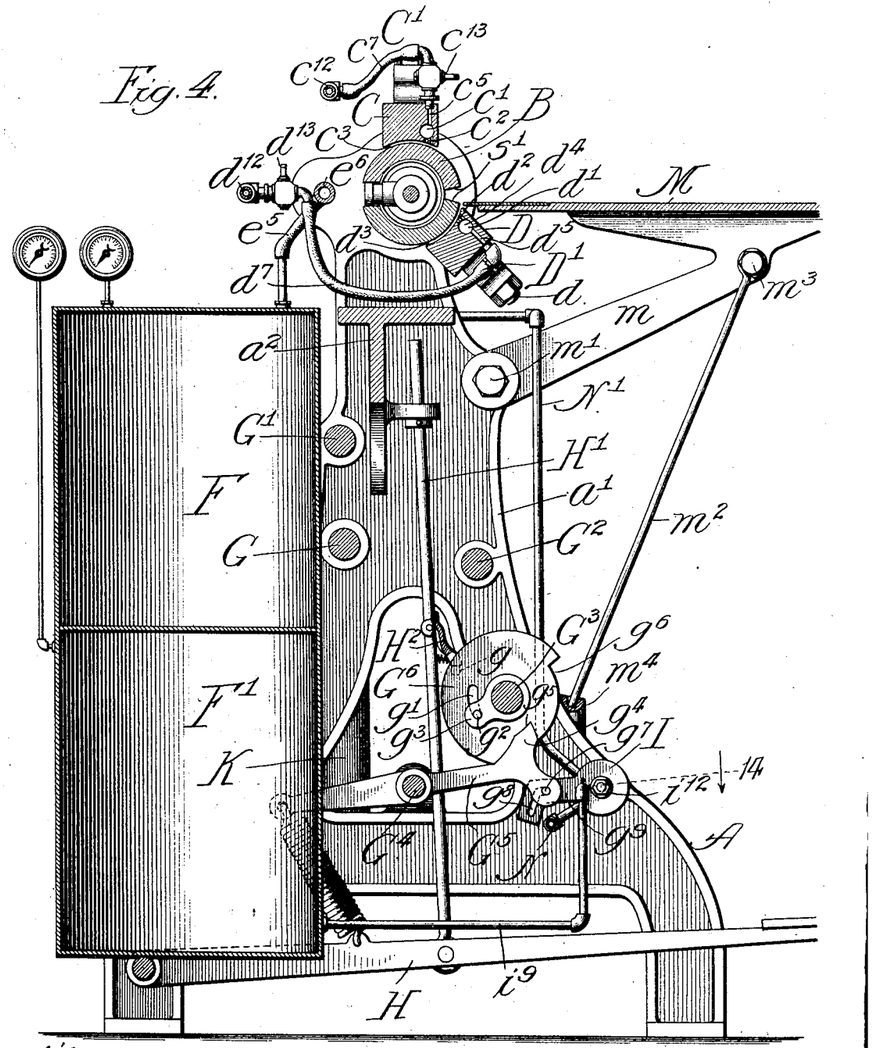
Fig. 4, a longitudinal vertical section taken as indicated at line 4 of Fig. 1.
Figure 5:
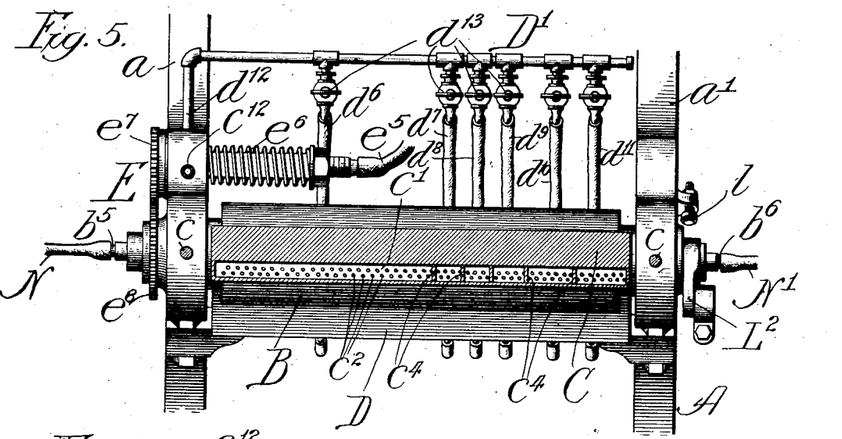
Fig. 5, a broken horizontal sectional view taken as indicated at line 5 of Fig. 1 and showing a detail of the upper shoe or concave.

The leaf confining and holding member or retainer C comprises a bar adjustably connected, by means of bolts $c$, with the upper ends of the side members of the frame. Said member is provided with a longitudinal bore $c'$, with which communicate minute suction-openings $c^2$, leading to the under or concave side $c^3$ of the member. The bore $c'$ is divided into separate chambers by partitions $c^4$, as shown in Fig. 5, and, as shown in Fig. 4, there are passages $c^5$ communicating with the upper side of the bore, and these passages are connected by the branch pipes $c^6$ to $c^{11}$, inclusive, of the suction device C', with the main pipe $c^{12}$ of said suction device. Similarly the member D is adjustably connected by bolts, is provided with the bore $d'$, perforations $d^2$, a concave surface $d^3$, partitions $d^4$, passages $d^5$, and branch pipes $d^6$ to $d^{11}$, inclusive, connected with the main pipe $d^{12}$ of the suction device D'. Valves $c^{13}$ $d^{13}$ are provided for controlling the several branch pipes shown.

Figure 6:
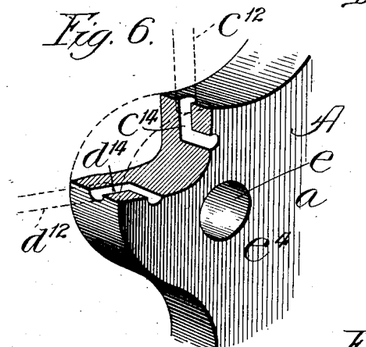
Fig. 6, a broken perspective view showing the parts in one of the frame members which coact with the part in the automatically-actuated suction-controlling valve.
Figure 7:
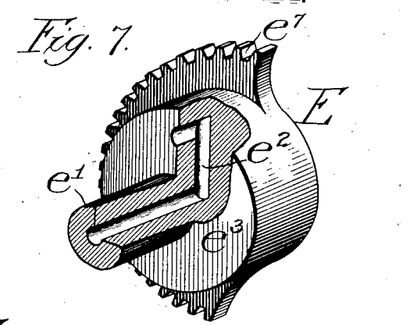
Fig. 7, a broken perspective view of said suction-controlling valve.
Figure 8:
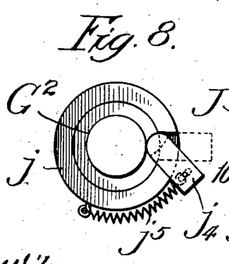
Figs. 8 to 11, inclusive, details of a clutch device, the sections shown at Figs. 10 and 11 being indicated at the line 10 of Fig. 9.

The pipes $c^{12}$ $d^{12}$ connect with passages $c^{14}$ $d^{14}$, which have orifices opening at the outer surface of the frame member $a$, as shown in Fig. 6. The frame member $a$ is provided with a perforation $e$, which receives the perforated stem or shank $e'$ of the valve E. The passage $e^2$ of the valve E has an orifice opening at the ground-surface $e^3$, which contacts with the ground-surface $e^4$ of the frame member $a$. The stem $e'$ is connected by a pipe or hose $e^5$ with the vacuum-chamber F. The spring $e^6$ serves to hold the valve in close contact with its seat. The valve E is equipped with a gear-segment $e^7$, which meshes with a gear $e^8$, mounted upon one trunnion of the rock-cylinder. Thus when the rock-cylinder is oscillated the valve E will be correspondingly oscillated.

In the construction shown the vacuum and pressure tanks F F' are provided by partitioning a cylinder in the manner shown in Fig. 4. Normally when the belt is on the fast pulley the shaft G rotates the shaft G' and the gear J, the shaft G' operating the pump and the gear J turning idly. When the foot-lever H is depressed, the pawl H² serves, through the medium of a small pin or stud $g$ on the cam G⁶, to rotate said cam on its shaft. Said cam G⁶ is provided with a slot $g'$, with which engages a pin $g^2$, carried by an arm $g^3$, fixed to the shaft G³. The pawl or cam-lever G⁵ is provided with a projection $g^4$, which normally engages a depression $g^5$ in the cam G⁶. There is an adjacent depression $g^6$ in said cam, the purpose of which will be presently explained. The pawl G⁵ is equipped with a pin $g^7$, which engages a cam-slot $g^8$, with which the actuating-arm $g^9$ of the valve I is provided. The slot $g^8$ is so shaped that the valve I will be actuated during the first movement of the pawl G⁵ under the action of the cam G⁶. The valve I stands normally in position to admit pressure through the pipe N', whereby the piston will stand normally in a position to permit the spring $b^{15}$ to open the jaws of the rock-cylinder.

The construction of the valve I is shown in detail in Figs. 12 to 16, inclusive. The frame member $a'$ is provided with a boss $i$, having a flat surface $i^2$, whereat opens the orifices of passages $i^3$ $i^4$, which are connected, respectively, with the pipes N N'. The valve comprises a disk equipped with the actuating-arm $g^9$ and provided with three perforations $i^5$, $i^6$ and $i^7$. With the intermediate perforation $i^6$ is connected a hose $i^8$, which in turn connects with the pipe $i^9$, joined to the pressure-chamber F'. The valve oscillates on the pivot-post $i^{10}$, equipped with a spring $i^{11}$, adjusted by nuts $i^{12}$.

Figures 9, 10, 11:
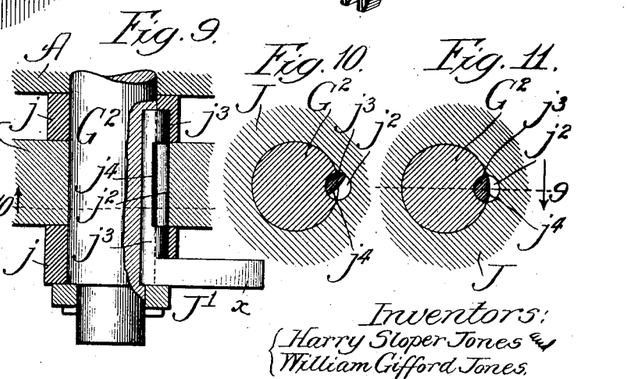
Figure 12:
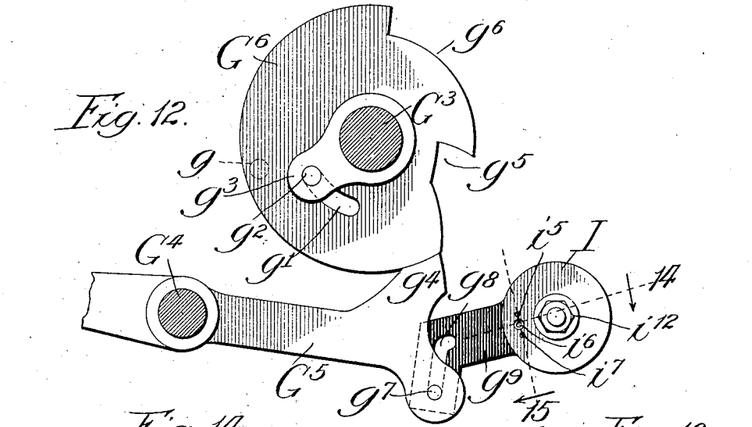
Fig. 12, a broken view illustrating the operation of the valve controlling the air-pressure for actuating the jaw-closing piston.
Figures 13, 14, 15:
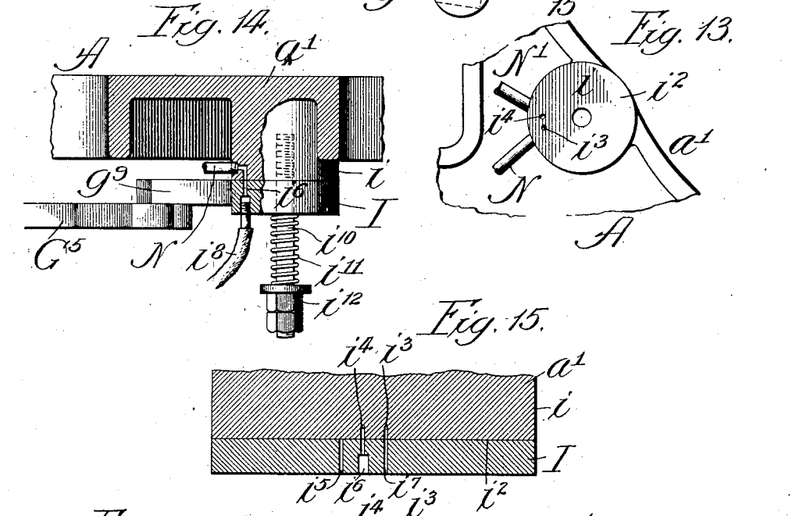
Fig. 13, a broken inner face view of the frame member shown in Fig. 14.
Fig. 14, a broken section taken as indicated at line 14 of Figs. 4 and 12 and showing a detail of the pressure-controlling valve.
Figs. 15 and 16, enlarged broken sections taken as indicated at line 15 of Fig. 12 and showing different positions of the pressure-controlling valve.
Figure 16:
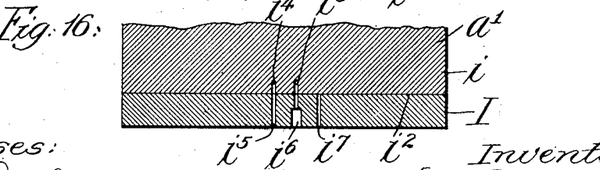

As shown in Figs. 2 and 8 to 11, inclusive, the gear J is confined between sleeves or collars $j$ on the shaft G², and the shaft, collars, and gear are provided with the complemental parts of an opening $j^2$, which receives a pin $j^3$, having a portion cut away at $j^4$, the surface at the cut-away portion being flush with the surface of the shaft when the clutch is in the idle position, as shown in Fig. 11. The outer end of the pin or clutch member $j^3$ is equipped with a short arm $x$, which is connected by a spring $j^5$ with the outer one of the collars $j$. The tendency of the arm $x$ is to drop, thereby bringing the clutch member $j^3$ into the operative position shown in Fig. 10. The pawl or trip member J² (shown in Fig. 2) normally serves to hold the clutch member in its inoperative position. When the member J² is rocked, however, the clutch member is released from its detent and permitted to assume the operative position. The lower end of the lever J² is provided with a slot $j^6$, which receives a pin $j^7$, with which the arm J³ on the rock-shaft G⁴ is provided. The slot $j^6$ is so shaped that while the end $j^7$ traverses its upper portion no movement of the lever J' takes place; but while the pin traverses the lower portion of the slot the trip is actuated to permit the clutch to assume the operative position and put the shaft G² into rotation, thereby actuating the rock-cylinder.

The pump K may be of any suitable construction. It is connected with the chambers F F' by pipes $f f'$, equipped, respectively, with relief-valves $f^2 f^3$. Any suitable check-valves (not shown) may be employed in said pipes and in the pump. The relief-valve $f^2$ will operate to admit air to the vacuum-chamber when the pressure therein falls below a predetermined point, and the valve $f^3$ will operate to release air from the chamber F' when the pressure therein reaches a predetermined amount. By this expedient a uniform vacuum is maintained in one chamber and a uniform pressure in the other chamber, and the requisite amount of air is supplied to the vacuum-chamber to provide the necessary amount of air for the pressure-chamber, the pump operating, it will be understood, to transfer air from the vacuum-chamber to the pressure-chamber.

The connecting-rod L is connected with the crank L' and the rock-arm L² by pins and split bearings, as shown. Spring-buffers $l$ $l'$ are provided to limit the movements of the arm L² and to aid in the initial return movements of said arm. Where the oscillation of the rock-cylinder is less than in the construction shown, as would be the case were a larger rock-cylinder provided, the spring-buffers may be dispensed with.

The table M may be of any suitable construction. Preferably it is supported upon bracket-arms $m$, connected with the frame by pivots $m'$, and is equipped with rods $m^2$, connected with the table by pivots $m^3$, the lower ends of the rods entering sockets $m^4$ near the base of the frame. This construction permits the table to be dropped to allow ready access to the rock-cylinder and the attendant parts.

Figure 26:
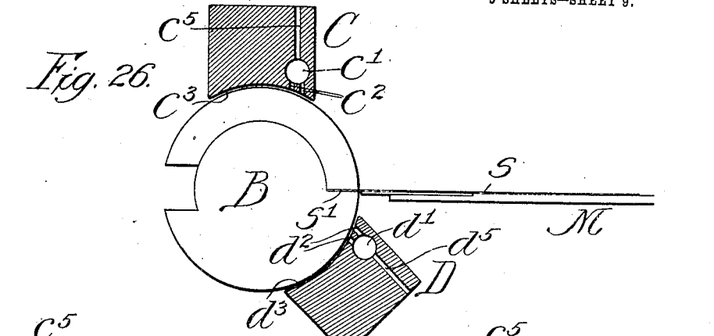
Figs. 26 to 30, inclusive, views diagrammatic in their nature, illustrating various steps in the operation of the machine.
Figures 27, 28, 29, 30, 31:
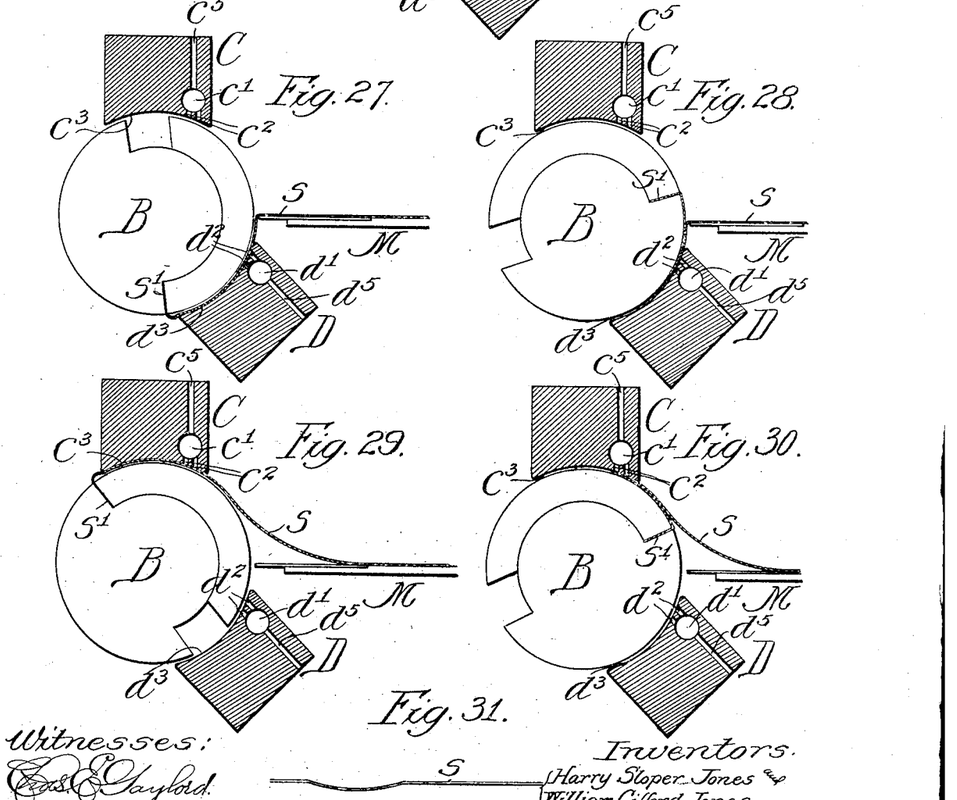
Fig. 31, a view showing a portion of the leaf after treatment and before the leaf has been subjected to a pressing operation for the purpose of straightening it.

From the foregoing description the operation will be readily understood. As has been stated, the shaft G' rotates continuously, thereby operating the pump continuously, and the gear J normally rotates idly. The jaws of the rock-cylinder stand normally open, as shown in Fig. 4. The operation of the machine is effected by the operator inserting the binding-margin of the leaf $s$ between the clamping-surfaces $s'$ of the jaws and depressing the foot-lever H. During the depression of the foot-lever H the pawl H² operates to rotate the cam G⁶ on its shaft, thereby depressing the cam-lever G⁵. In the first portion of the movement of the lever G⁵ the valve I (which, it will be remembered, stands normally in position to admit air to the pipe N') is moved to admit air to the pipe N, thereby causing the jaws of the rock-cylinder to be closed upon the binding-margin of the leaf, and in the final portion of the movement of the lever G⁵ the rock-shaft G⁴, operated thereby, acts finally, through the arm J³, to move the trip J² and permit the clutch to operate on the shaft G². As soon as the shaft G² begins to rotate it sets the rock-cylinder in motion and through the medium thereof turns the valve E in the proper direction to apply suction through the lower member D. In the meantime the leaf is carried between the rock-cylinder and the member D, as shown in Fig. 26. The rock-cylinder rotates far enough in this direction to cause a small portion of the leaf to be exposed at the rear side of the member D, and when the rock-cylinder starts on its return movement the leaf is caused to buckle slightly, and during the return movement the leaf is rolled closely upon itself in the manner shown in Fig. 28, it being remembered that suction is acting upon the leaf in the meantime to hold it against the shoe D while the flexing operation is taking place. Before the leaf is released the cylinder moves from its normal intermediate position to one end of its traverse, carrying the leaf beneath the member D, then over to the other end of its traverse, carrying the leaf beneath the member C, then back again to the first end of its traverse, then again to the second end of its traverse, and finally back to its normal intermediate position. Thus the leaf is flexed in each direction twice, and this is found to be sufficient with ordinary ledger-paper to accomplish the desired result. It will be understood, of course, that the machine operates very rapidly, and it may be stated that when the cylinder returns to its normal position and the jaws fly open the leaf, under its own resiliency, springs out of the jaws. Subsequently the leaves are suitably compressed to render them compact and flat. It will be observed that the operation is such that the machine will automatically stop after completing its cycle of operations regardless of whether the foot-lever H remains depressed or not. It here may be stated that the purpose of the depression g⁶ of the cam is to permit the cam-lever G⁵ to return part way as the cam rotates with the shaft G³, actuated by the gear P³, and take up the lost-motion connection with the operating-arm of the valve I, so that when the depression g⁵ passes again beneath the projection g⁴ of the cam-lever the cam-lever will move quickly to its normal position of rest, thereby actuating the valve I to connect the pressure again with the pipe N', whereby the piston b⁷ will be actuated in a direction to permit the jaws to be opened by the action of their spring. We have shown buffer-rings t for limiting the movement of the piston.

It will be observed that our improved machine provides for flexing the leaf along lines infinitely close to each other and while the leaf is bent closely upon itself first in one direction and then in the other and has a certain amount of pressure applied, still the continuous shifting of the line of flexure prevents the establishment of definite lines of weakness in the treated zone of the paper, the result being that greatly-increased flexibility is obtained without appreciably injuring the fiber of the paper and without destroying the surface at the treated zone for writing purposes. Because of the fact that no definite lines of weakness are established it is possible to treat the leaf from the extreme top edge to the bottom edge without rendering the leaf liable to be torn. By providing the partitions in the longitudinal bores of the members C and D and controlling the exhaust through the several chambers thus established by means of separate stop-cocks it is possible to adjust the machine to any desired width of leaf, as will be readily understood.

Figure 25:
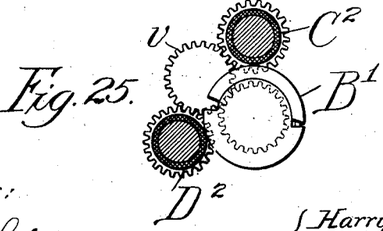
Fig. 25, a view illustrating a modification.

While we have shown a machine complete in all its details and adapted to be operated by unskilled persons, still it will be understood that the machine may be altered in many ways while retaining many of its features of advantage. For instance, in Fig. 25 we have represented a modification wherein B' represents a rock-cylinder, and C² D² friction-rollers coacting with the cylinder B' and constituting, in effect, leaf confining and holding members. In this construction the suction devices are dispensed with and the rollers C² D² are geared through an idler v to the cylinder B'. The gearing is such that after the leaf has been carried through the required distance the friction-roller with which it is in engagement rotates in the direction opposite to the direction of movement of the returning rock-cylinder, thereby preventing the leaf from slipping while the rock-cylinder returns with the gripped edge.

Many other changes in details within the spirit of our invention may be made. Hence no undue limitation should be understood from the detailed description given, the same having been given for clearness of understanding only.

The gist of the invention lies in providing relatively movable leaf-confining members having the function of flexing the leaf, associated with means for shifting the leaf to produce change in the line of curvature in the leaf, along very closely-related lines. Obviously the member B acts as a leaf-confining member, as do also the members C and D. So, also, the member B is equipped with leaf-holding (retaining) means—i. e., its jaws—and the members C and D are equipped with leaf-holding means—i. e., the suction devices.

In addition the member B by virtue of jaw-equipment and actuating (rocking) means serves in the shifting of the leaf. In the broadest sense, therefore, the rocking member B is to be regarded as a leaf-confining member, and, when jaw-equipped, it is to be regarded as a leaf confining and holding member, and when so equipped and also provided with oscillating means is to be regarded as a leaf confining, holding, and shifting member. We believe that the simplest arrangement is to combine the parts in the precise manner shown; but the characteristic functions noted may be present even though this construction may be varied.

What we regard as new, and desire to secure by Letters Patent, is—

1. In a machine of the character described, means for confining a leaf and flexing it throughout a limited zone, said means varying the place of flexure through very closely adjacent lines and causing a portion of the leaf to shift while the flexing is performed.

2. In a machine of the character set forth, means for confining a leaf and flexing it throughout a limited zone, said means including relatively moving leaf-confining members between which the portion of the leaf under treatment may be shifted and operating to vary the place of flexure through very closely adjacent lines and causing a portion of the leaf to shift while the flexing function is performed.

3. In a leaf-flexing machine, means for flexing the leaf upon itself and shifting the place of flexure through lines inappreciably removed from each other including leaf-gripping means, for the purpose set forth.

4. In a leaf-flexing machine, means for flexing the leaf upon itself in two directions along very closely related lines, throughout a limited zone including leaf-gripping means, for the purpose set forth.

5. In a leaf-flexing machine, the combination of curved leaf confining and holding devices, and means for producing relative movement of said devices and causing them to apply a shifting flexure to the leaf in one direction and then in the reverse direction over the same area, throughout a given zone, for the purpose set forth.

6. In a leaf-flexing machine, the combination of relatively movable leaf confining and holding devices, operating to bend the leaf upon itself about a very small radius and shift the place of bending, for the purpose set forth.

7. In a leaf-flexing machine, the combination of a rocking member equipped with gripping means, and a leaf confining and holding member in juxtaposition therewith, said members serving to fold a leaf between them and shift the line of flexure throughout a limited zone, for the purpose set forth.

8. In a leaf-flexing machine, the combination of a rocking member equipped with gripping means, and a leaf confining and holding member in juxtaposition therewith equipped with a suction device, said members serving to fold a leaf between them and shift the line of flexure throughout a limited zone, for the purpose set forth.

9. In a leaf-flexing machine, the combination of a rocking member equipped with means for holding the margin of a leaf, and a juxtaposed member coacting with said rocking member equipped with a suction device having orifices opening near its front portion adjacent to said rocking member, whereby a leaf may be drawn between said members, the suction applied to the leaf adjacent to the section to be flexed, and the leaf folded upon itself in the return movement of the rocking member, for the purpose set forth.

10. In a machine of the character described, the combination of a rocking member equipped with jaws having the gripping-space between them accessible in the normal position of rest, and a pair of coacting leaf confining and holding members adjacent to said first-named member and arranged on opposite sides of said space, said rocking member having a range of movement enabling it to carry the leaf between the rocking member and each of said second-named members, for the purpose set forth.

11. In a leaf-flexing machine, the combination of a frame, a table, a jaw-equipped rocking cylinder normally occupying a position with its gripping-plane adjacent to the rear edge of said table, and a pair of leaf confining and holding members arranged above and below the plane of said table, for the purpose set forth.

12. In a machine of the character set forth, the combination with a rocking member equipped with means for holding a margin of a leaf, a pair of juxtaposed concaves, and suction devices having orifices opening near the front edges of the concaves, for the purpose set forth.

13. In a machine of the character set forth, the combination of a rock-cylinder equipped with jaws, means for actuating the jaws, a pair of concaves, suction devices connected with said concaves, and means for controlling the suction, for the purpose set forth.

14. In a machine of the character described, the combination of a rock-cylinder equipped with pneumatically-actuated jaws, and a leaf confining and holding member adjacent to said rock-cylinder, and operating in conjunction with the cylinder to flex a leaf and shift the place of flexure uniformly throughout a given zone, for the purpose set forth.

15. In a machine of the character set forth, the combination of a jaw-equipped rock-cylinder having normally open jaws, and a pair of leaf confining and holding members adjacent to said cylinder and on opposite sides of the normal gripping-plane of the jaws, for the purpose set forth.

16. In a machine of the character set forth, the combination of a jaw-equipped rock-cylinder having normally open jaws, means for closing the jaws, and a pair of concaves adjacent to the cylinder on opposite sides of the normal gripping-plane of the jaws equipped with suction devices having orifices at the front portions of said second-named members, for the purpose set forth.

17. In a machine of the character set forth, the combination of a rock-cylinder equipped with grippers and pneumatic actuating means for the grippers, a leaf confining and holding member equipped with a suction device, a pump, and pressure and vacuum chambers connected with said pump and respectively joined to said pneumatic actuating means and said suction device, for the purpose set forth.

18. In a machine of the character set forth, the combination of a rock-cylinder equipped with jaws, a piston movable longitudinally of the rock-cylinder and serving in the actuation of the jaws, and a leaf confining and holding member serving in conjunction with the rock-cylinder to bend a leaf upon itself and vary the line of flexure, for the purpose set forth.

19. In a machine of the character set forth, the combination of a cylinder equipped with gripping-jaws, a jaw-actuating piston movable longitudinally in said cylinder, and a leaf confining and holding member adjacent to the cylinder and acting in conjunction with the cylinder to fold a leaf upon itself and vary the line of flexure said last-named member and the cylinder being relatively movable, for the purpose set forth.

20. In a machine of the character set forth, the combination of a rock-cylinder provided with gripping-jaws and equipped internally with cylinders, a jaw-actuating piston, pipes communicating through the journals of said rock-cylinder with said internal cylinders, a valve controlling said pipes, means for actuating said valve in one direction, and a leaf confining and holding member coacting with said rock-cylinder, for the purpose set forth.

21. In a machine of the character set forth, the combination of a rock-cylinder equipped with grippers, means for actuating the grippers, means for actuating the rock-cylinder, a leaf confining and holding member adjacent to the rock-cylinder, and mechanism for controlling the movements of said cylinder comprising means for setting the cylinder in motion, and automatically-actuated means for stopping the cylinder, for the purpose set forth.

22. In a machine of the character set forth, the combination of a rock-cylinder equipped with grippers, means for actuating the grippers, means for actuating the rock-cylinder, a leaf confining and holding member adjacent to the rock-cylinder, and mechanism for controlling the movements of the cylinder and the actuation of its grippers, comprising means for governing the closing of the grippers of the cylinder and setting the machine in motion, and automatic means for governing the stopping of the cylinder and opening the grippers, for the purpose set forth.

23. In a machine of the character set forth, the combination of a rock-cylinder equipped with grippers, pneumatic means for closing said grippers, a leaf confining and holding member adjacent to said cylinder, and controlling mechanism comprising a normally inactive shaft connected with said cylinder, a continuously-rotating member, a clutch for connecting the normally inactive shaft, a suitably-actuated cam, means for actuating said cam to operate said clutch, and means for automatically continuing the movement of said cam, whereby the cam serves to release said clutch after the machine has completed its cycle of operations, for the purpose set forth.

24. In a machine of the character set forth, the combination with a rock-cylinder provided with gripping-jaws and pneumatic means for actuating the same, a leaf confining and holding member adjacent to said cylinder, a valve controlling the admission to said cylinder, a normally inactive shaft connected with said cylinder, a clutch through the medium of which said shaft may be actuated, and mechanism whereby said cam serves, in its initial movement, to actuate said valve, and thereafter to throw said clutch into operation, and finally to release said clutch after the machine has completed its cycle of operations, for the purpose set forth.

25. In a machine of the character set forth, the combination of a rock-cylinder equipped with gripping-jaws, pneumatic means for actuating said jaws, a valve controlling the admission to said pneumatic means, concaves adjacent to said cylinder equipped with suction devices, a valve controlling said suction devices, means for actuating said cylinder, and mechanism manually actuated in the operation of starting the machine and automatically actuated in the operation of stopping the machine, whereby, in a cycle of operations of the machine, said jaws are closed after a leaf is introduced, said cylinder set in motion, the suction applied alternately to said suction devices, the cylinder stopped, and the jaws released, for the purpose set forth.

26. In a machine of the character set forth, the combination with a rock-cylinder, of a pair of concaves coacting therewith and equipped with suction devices, a valve controlling said suction devices, and valve-actuating means operated from said cylinder, for the purpose set forth.

27. In a machine of the character set forth, the combination of a rock-cylinder having a jaw equipped with trunnions and a relatively movable jaw, actuating means for the cylinder connected with one of said trunnions, actuating means for said second-named jaw, and a leaf confining and holding member adjacent to said cylinder, for the purpose set forth.

28. In a machine of the character set forth, the combination of a rock-cylinder having a jaw equipped with trunnions and a jaw pivotally supported on said first-named jaw, a piston movable longitudinally in said cylinder and equipped with jaw-actuating means, means connected with one trunnion of the cylinder for actuating the cylinder, and a leaf confining and holding member adjacent to said cylinder, for the purpose set forth.

29. In a machine of the character set forth, the combination of a rock-cylinder and a concave adjacent thereto equipped with a suction device, said suction device being provided with means for limiting the extent whereat the suction is applied, whereby leaves of different width may be treated, for the purpose set forth.

30. In a machine of the character set forth, the combination of a rock-cylinder provided with pneumatically-actuated jaws, concaves adjacent thereto equipped with suction devices, and actuating and controlling means, comprising a normally inactive shaft, a clutch for the same, a shaft geared to said first-named shaft, a cam mounted thereon and capable of limited movement with relation thereto, a cam-lever, manual means for initially moving said cam, and valves controlling the pneumatic pressure and the suction, for the purpose set forth.

31. In a leaf-flexing machine, the combination with leaf confining and holding members, of a normally inactive shaft from which one of said members is actuated, a clutch therefor, a second shaft geared to the first-named shaft, a cam having lost-motion connection with said second-named shaft, a cam-lever, a valve operated thereby, and a trip on said second-named shaft controlling said clutch, for the purpose set forth.

32. The combination of a rock-cylinder having pneumatically-actuated gripping-jaws, pipes leading to said cylinder, a valve controlling said pipes, a foot-lever controlling said valve, and a leaf confining and holding member adjacent to said cylinder, for the purpose set forth.

33. The combination of a rock-cylinder having pneumatically-actuated gripping-jaws, a valve controlling the admission thereto, concaves equipped with suction devices, a valve controlling the suction devices, a normally inactive shaft joined to said rock-cylinder, a second shaft geared to said first-named shaft, a clutch for the first-named shaft controlled by the second-named shaft, a cam having lost-motion connection with the second-named shaft, a cam-lever coacting with said cam and controlling said first-named valve, means for moving said cam to operate said first-named valve and said clutch, and actuating means for the second-named valve, for the purpose set forth.

34. In a leaf-flexing machine, the combination with a frame member having air-passages opening at a flat surface, a spring-held rotary valve having a flat surface engaging said first-named surface, an oscillating member equipped with leaf-gripping jaws, and pneumatic jaw-actuating means connected with the air-passages of said frame member, for the purpose set forth.

35. The combination of a rock-cylinder equipped with gripping-jaws, means for turning said rock-cylinder, a concave equipped with a suction device, a valve controlling the suction, and gear connection between said rock-cylinder and suction-controlling valve, for the purpose set forth.

36. The combination of a rock-cylinder equipped with grippers, a coacting leaf-confining member equipped with a device for holding a leaf at a point near the area to be treated, and mechanism serving to close said grippers, turn the cylinder, apply holding force to the leaf through said second-named member, reverse the cylinder, and open the grippers, for the purpose set forth.

37. The combination of a rock-cylinder equipped with grippers, a pair of coacting leaf confining and holding members, and mechanism serving to close the grippers, impart to said cylinder a plurality of reciprocations in each direction from its normal position of rest, and then open the grippers, for the purpose set forth.

HARRY SLOPER JONES.
WILLIAM GIFFORD JONES.

In presence of—
M. S. MACKENZIE,
J. H. LANDES.